(12) United States Patent
Kristlbauer

(10) Patent No.: US 11,220,419 B2
(45) Date of Patent: Jan. 11, 2022

(54) BEVERAGE PREPARATION MACHINE WITH FOAM REFINEMENT

(71) Applicant: SOCIETE DES PRODUITS NESTLE S.A., Vevey (CH)

(72) Inventor: Jurgen Kristlbauer, Zollikofen (CH)

(73) Assignee: Societe des Produits Nestle S.A., Vevey (CH)

( * ) Notice: Subject to any disclaimer, the term of this patent is extended or adjusted under 35 U.S.C. 154(b) by 0 days.

(21) Appl. No.: 16/954,658

(22) PCT Filed: Dec. 18, 2018

(86) PCT No.: PCT/EP2018/085359
§ 371 (c)(1),
(2) Date: Jun. 17, 2020

(87) PCT Pub. No.: WO2019/121593
PCT Pub. Date: Jun. 27, 2019

(65) Prior Publication Data
US 2020/0307984 A1      Oct. 1, 2020

(30) Foreign Application Priority Data

Dec. 20, 2017  (EP) .................................... 17208727

(51) Int. Cl.
*B67D 1/12*    (2006.01)
*B67D 1/00*    (2006.01)
*B67D 1/07*    (2006.01)

(52) U.S. Cl.
CPC ......... *B67D 1/1275* (2013.01); *B67D 1/0004* (2013.01); *B67D 1/07* (2013.01); *B67D 1/1256* (2013.01)

(58) Field of Classification Search
CPC ...... B67D 1/1275; B67D 1/0004; B67D 1/07; B67D 1/1256
(Continued)

(56) References Cited

U.S. PATENT DOCUMENTS

| 978,616 | A | * | 12/1910 | Mitats | .................. | B67D 1/0004 |
| | | | | | | 222/132 |
| 2013/0115342 | A1 | * | 5/2013 | Van Os | .................... | A47J 42/50 |
| | | | | | | 426/231 |

(Continued)

FOREIGN PATENT DOCUMENTS

| DE | 10260040 | 7/2004 |
| DE | 102009001200 | 9/2010 |

(Continued)

*Primary Examiner* — Paul R Durand
*Assistant Examiner* — Michael J. Melaragno
(74) *Attorney, Agent, or Firm* — K&L Gates LLP

(57) ABSTRACT

A machine (1) for dispensing a beverage (100) has: a beverage directing guide (10) for directing by the directing guide (10) beverage (100) to an area (2) for placing a user-recipient; and a beverage processing unit (5) having a unit outlet (51) via which liquid (100,101) is passed from the beverage guide (50) to the directing guide (10) that is located below the unit outlet (51). The directing guide (10) has a flow cavity (10a), a bottom (10b) and sidewalls (10c) such that the bottom (10b) and the sidewalls (10c) delimit the flow cavity (10a). The directing guide (10) has an inflow penetrator (12) for acting on a flow of beverage (100) delivered by the unit outlet (51) onto the penetrator (12) prior to reaching the bottom (10b) of the flow cavity (10a).

20 Claims, 3 Drawing Sheets

(58) Field of Classification Search
USPC .......................................................... 222/109
See application file for complete search history.

(56) References Cited

U.S. PATENT DOCUMENTS

| | | | | |
|---|---|---|---|---|
| 2013/0276638 | A1* | 10/2013 | Kristlbauer | A47J 31/407 99/295 |
| 2014/0352545 | A1* | 12/2014 | Cahen | A47J 31/4403 99/295 |
| 2016/0066742 | A1* | 3/2016 | de Graaff | A47J 31/4403 99/280 |
| 2017/0367524 | A1* | 12/2017 | de Graaff | A47J 31/3676 |
| 2019/0382281 | A1* | 12/2019 | Moon | B01D 35/04 |
| 2019/0389712 | A1* | 12/2019 | Kim | B67D 1/0878 |
| 2020/0122996 | A1* | 4/2020 | Matsumoto | G07F 13/00 |
| 2020/0307985 | A1* | 10/2020 | Kristlbauer | A47J 31/3628 |

FOREIGN PATENT DOCUMENTS

| | | |
|---|---|---|
| EP | 1371311 | 12/2003 |
| WO | 2006093406 | 9/2006 |

* cited by examiner

Fig. 4
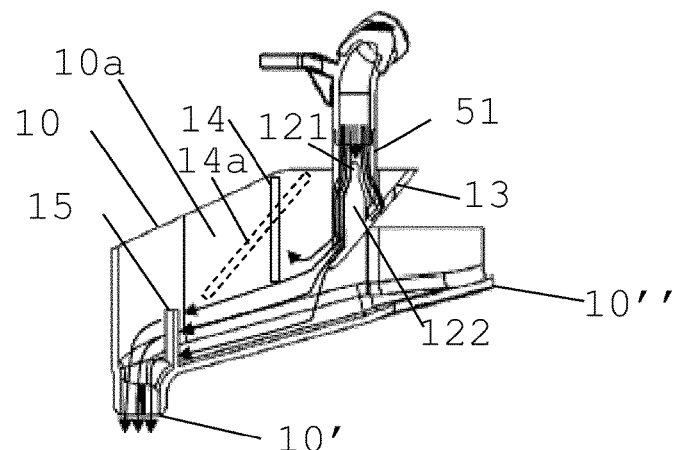
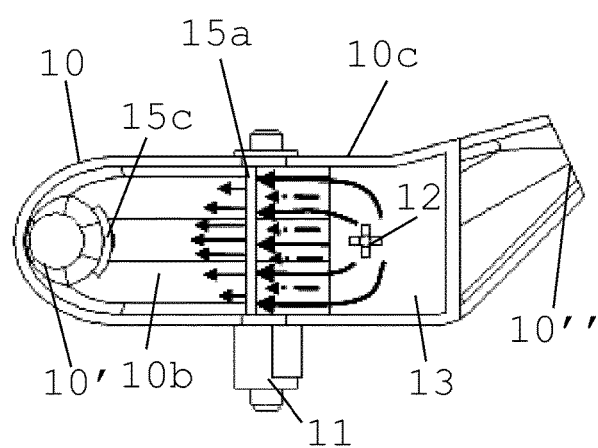
Fig. 5
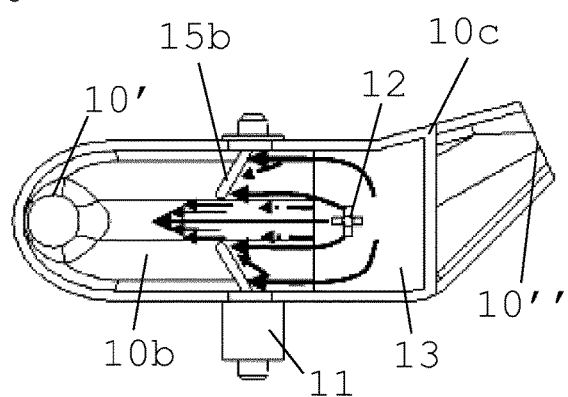
Fig. 6
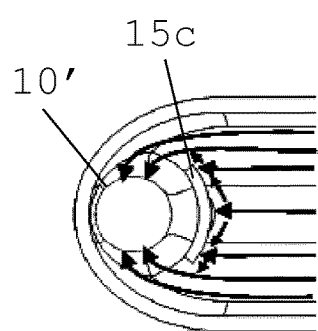
Fig. 7
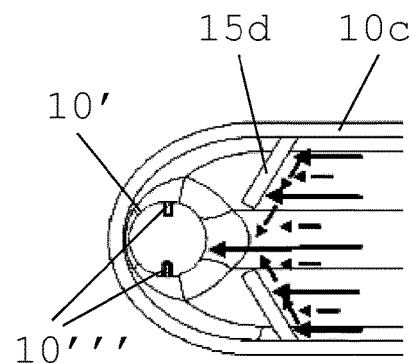
Fig. 8

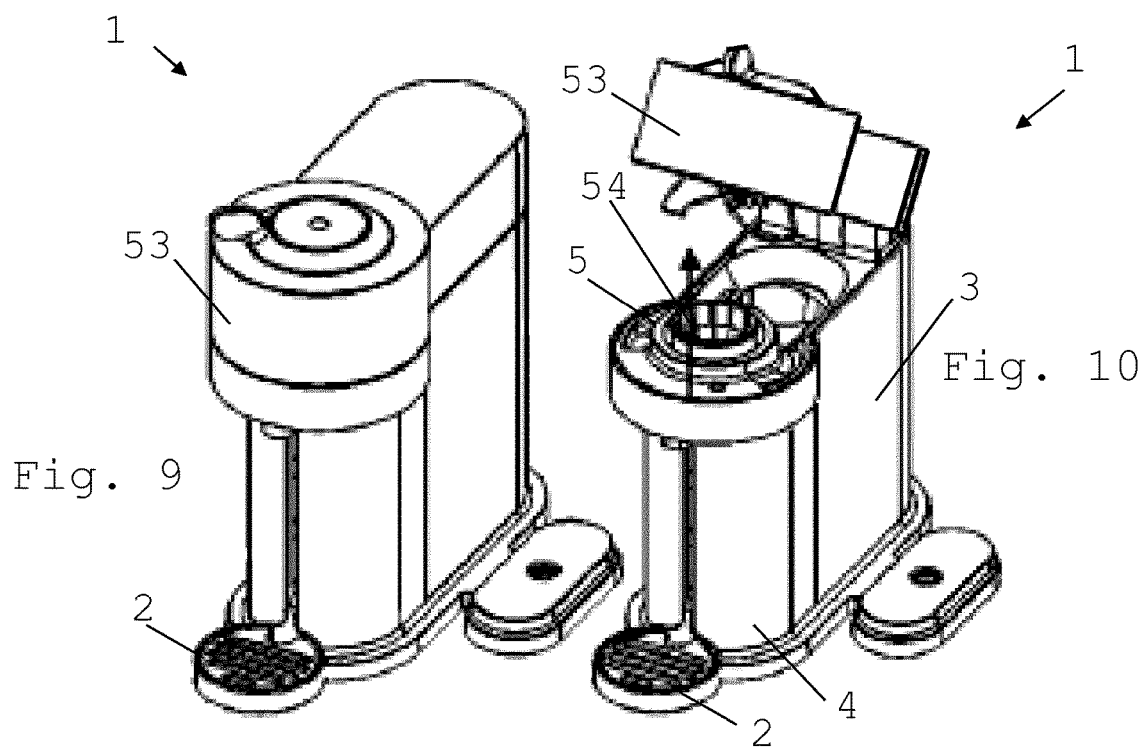
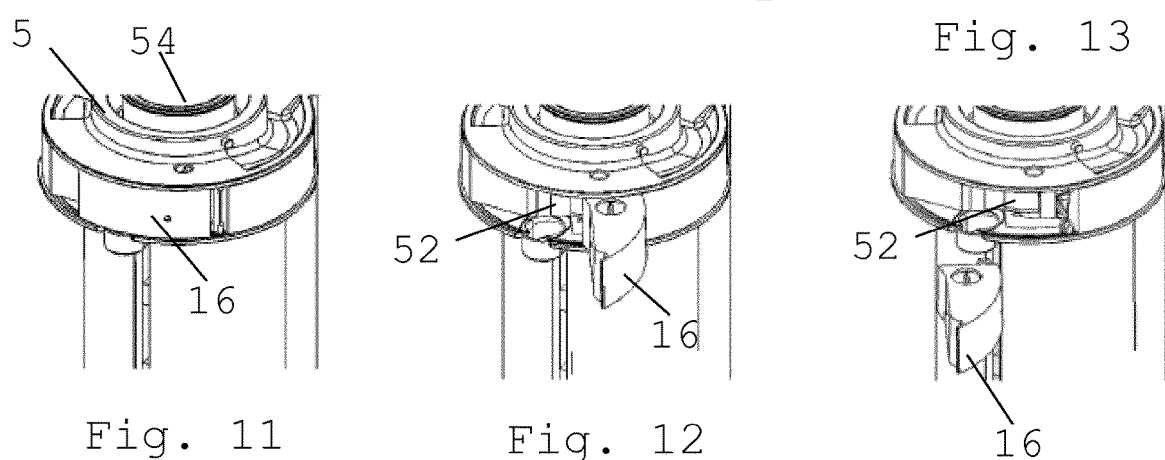
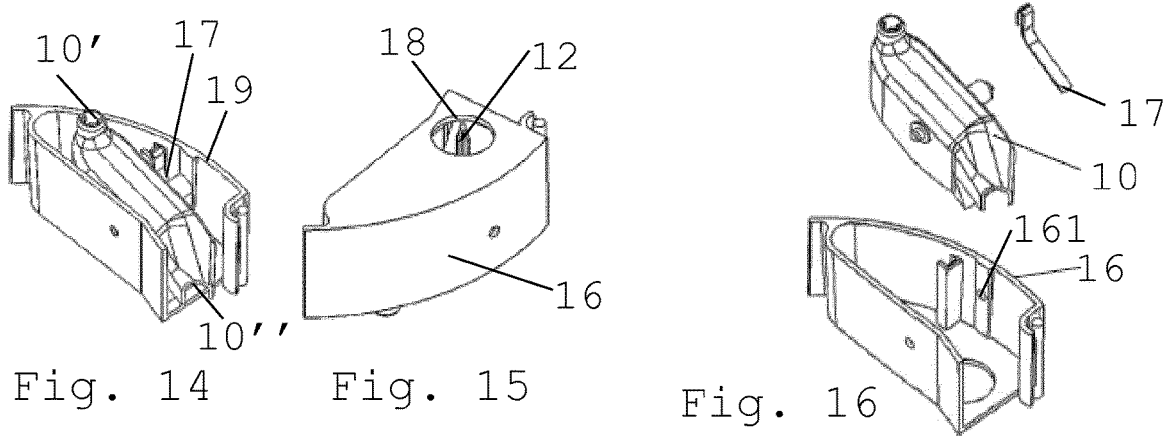

BEVERAGE PREPARATION MACHINE WITH FOAM REFINEMENT

CROSS REFERENCE TO RELATED APPLICATIONS

The present application is a National Stage of International Application No. PCT/EP2018/085359, filed on Dec. 18, 2018, which claims priority to European Patent Application No. 17208727.2, filed on Dec. 20, 2017, the entire contents of which are being incorporated herein by reference.

FIELD OF THE INVENTION

The field of the invention pertains to beverage preparation machines, in particular using capsules of an ingredient of the beverage to be prepared, having an arrangement for refining beverage foam produced with the beverage.

For the purpose of the present description, a "beverage" is meant to include any human-consumable liquid substance, such as tea, coffee, hot or cold chocolate, milk, soup, baby food, etc. . . . . A "capsule" is meant to include any pre-portioned beverage ingredient, such as a flavouring ingredient, within an enclosing packaging of any material, in particular an airtight packaging, e.g. plastic, aluminium, recyclable and/or biodegradable packagings, and of any shape and structure, including soft pods or rigid cartridges containing the ingredient. The capsule may contain an amount of ingredient for preparing a single beverage serving or a plurality of beverage servings.

BACKGROUND ART

Certain beverage preparation machines use capsules containing ingredients to be extracted or to be dissolved; for other machines, the ingredients are stored and dosed automatically in the machine or else are added at the time of preparation of the drink.

Most beverage machines possess within a housing: filling means that include a pump for liquid, usually water, which pumps the liquid from a source of water that is cold or indeed heated through heating means, such as a heating resistor, a boiler, a thermoblock or the like, a brewing unit in which an ingredient is brewed with water or a mixing unit in which ingredients are mixed together, and a beverage outlet for dispensing the prepared beverage. Typically, the beverage outlet is located above a beverage dispensing zone, e.g. above a grid for supporting a cup or other recipient under the outlet and for the passage of drops of liquid from the beverage outlet or other spills into a collector tray located under the grid.

For example, EP 1 440 639 discloses a beverage machine comprising a receptacle stand having a hollow interior forming a drip tray. An upper surface of the receptacle stand is provided with a grill on which the receptacle is positioned. The drip tray is removable from the housing to ease emptying of the collected water. Drip tray devices with cup supports are well known in the art. There are also such devices that are further arranged for allowing the adjustment of the vertical position under the beverage outlet of cups of different sizes. Examples of arrangements in this field are disclosed in CA 2,260,352, EP 0 549 887, EP 1 731 065, EP 1 867 260, FR 2 439 042, U.S. Pat. Nos. 5,161,455, 5,353,692 and WO 2009/074557.

WO 2006/050769, WO 2012/072758, WO 2013/127907, WO 2016/050657, WO 2016/083485 and PCT/EP17/075724 disclose various beverage machines having a beverage guide located downstream an ingredient processing module and for managing the beverage.

There is a need to provide a management system of beverages that foam during their preparation such that the dispensed beverage has a controlled foam, e.g. controlled crema when the beverage is coffee.

SUMMARY OF THE INVENTION

The invention relates to a machine for dispensing a beverage. The beverage preparation machine can be an in-home or out of home machine. The machine may be for the preparation of coffee, tea, chocolate, cacao, milk, soup, baby food, etc. . . .

The machine may be arranged for preparing within a beverage preparation unit a beverage by passing hot or cold water or another liquid through a capsule containing an ingredient, such as a flavoring ingredient, of the beverage to be prepared, such as ground coffee or tea or chocolate or cacao or milk powder.

The beverage preparation typically includes the mixing of a plurality of beverage ingredients, e.g. water and milk powder, and/or the infusion of a beverage ingredient, such as an infusion of ground coffee or tea with water. One or more of such ingredients may be supplied in loose and/or agglomerate powder form and/or in liquid form, in particular in a concentrate form. A carrier or diluents liquid, e.g. water, may be mixed with such ingredient to form the beverage. Typically, a predetermined amount of beverage is formed and dispensed on user-request, which corresponds to a serving. The volume of such a serving may be in the range of 25 to 200 ml and even up to 400 or 1000 ml, e.g. the volume for filling a cup or a mug, depending on the type of beverage. Formed and dispensed beverages may be selected from ristrettos, espressos, lungos, cappuccinos, latte macchiato, café latte, americano coffees, teas, etc. In particular, a coffee machine may be configured for dispensing espressos, e.g. an adjustable volume of 20 to 60 ml per serving, and/or for dispensing lungos, e.g. a volume in the range of 70 to 150 ml per serving, and/or for dispensing americanos, e.g. a volume in the range of 150 to 500 ml.

The machine may include a (stationary) frame and/or housing in which and/or to which the machine's components, e.g. the components mentioned below, are assembled. Exemplary beverage preparation architectures are for instance disclosed in WO 2009/074550 and WO 2009/130099.

For instance, the beverage preparation unit is assembled to a machine's frame, e.g. a housing.

In an embodiment, the ingredient is supplied within a capsule to the beverage preparation unit. Such a capsule may have a container covered by a lid e.g. a container and/or a lid extending radially to form a flange.

In the processing configuration, the processing unit may form an ingredient chamber for containing and processing the ingredient.

Examples of ingredient processing units are described in WO 2007/135135, WO 2009/043630, WO 2011/042400, WO 2014/096122 and WO 2014/096123.

The processing unit can be configured to process a capsule containing the beverage ingredient. The unit can have an ingredient chamber with at least one capsule opener, such as at least one of: one or more puncturing and/or tearing elements; and one or more pins and/or blades, such as a capsule piercer or tearing plate, e.g. as known from EP 0 512 468, EP 0 512 470, EP 1 299 022, EP 1 339 305, WO 2013/026845, WO 2014/076041, WO 2015/022342, WO 2015/022344 and WO 2015/022345.

The machine may further include a liquid driver, such as a pump, for driving a liquid, e.g. water, along a liquid line from a liquid source, such as a liquid reservoir, via the processing module. Examples of pumps in beverage machines are disclosed in WO 2006/005425, WO 2009/024500, WO 2009/150030, WO 2010/108700 and WO 2011/107574, Liquid may be driven in the processing unit via a thermal conditioner such as a heater and/or a cooler.

A suitable heater may be a boiler, a thermoblock or an on demand heater (ODH), for instance an ODH disclosed in EP 1 253 844, EP 1 380 243 and EP 1 809 151. Other heaters are disclosed in WO 2009/043851, WO 2009/043865, WO 2009/092746 and WO 2011/157675 and WO 2012/007260.

The machine has: a beverage directing guide for directing by the directing guide a beverage to an area for placing a user-recipient, e.g. a cup or a mug, to collect such dispensed beverage; and a beverage processing unit having a beverage guide and a unit outlet via which liquid, e.g. beverage and/or waste liquid, is passed from the beverage guide to the directing guide that is located below the unit outlet. The directing guide has a flow cavity, a bottom and sidewalls such that the bottom and the sidewalls delimit the flow cavity.

The placing area can be delimited by a receptacle support. Typically the support includes a support surface for positioning a user-recipient, e.g. a mug or a cup, to collect the dispensed beverage. The support surface may be formed by a support member that is part of the machine or may be a virtual surface, e.g. the surface of a table on which the machine is placed. Examples of such support surfaces for user-recipients are disclosed in EP 1 867 260, WO 2009/074557 and WO 2013/104636.

The directing guide may incorporate different flow managing elements, e.g. as disclosed in PCT/EP17/075726.

The directing guide has an inflow penetrator, such as an inflow-exposed protuberance, for penetrating a flow of beverage delivered by the unit outlet onto the penetrator prior to reaching the bottom of the flow cavity.

Hence, when the beverage arrives at the directing guide, such an inflow penetrator acts on the flow of beverage.

Such action by the penetrator may result in the explosion of large bubbles carried with the beverage to refine the beverage's foam formed by the bubbles, e.g. crema in the case of coffee. In this case, the beverage with the refined foam then reaches the bottom of the flow cavity along which it is drained towards the placing area for the user-recipient.

The action of the inflow penetrator may serve to narrow the flow section of the beverage, e.g. if and when the penetrator enters the unit outlet, so as to reduce the flow rate of the beverage received in the directing guide, e.g. to increase the processing of the beverage upstream the directing guide.

The action of the inflow penetrator may serve to split or part the flow of beverage delivered into the directing guide.

The inflow penetrator can have one or more of the following features:
an upright generally spear-shaped member such as a member having a cross-section that has the shape of a cross or star or circle or convex polygon;
a top, such as a tapered top, that extends into the unit outlet, e.g. over a length in the range of 0.01 to 7 mm such as 0.3 to 3 mm, or that is spaced under the unit outlet by a distance in the range of 0.01 to 5 mm such as 0.3 to 3 mm; and
a tapered top, e.g. a tapered top extending over a length in the range of 1 to 7 mm such as 2 to 5 mm, that extends from a cylindrical or prismatic penetrator bottom, e.g. a bottom extending over a length in the range of 1 to 15 mm such as 3 to 7 mm, optionally the penetrator bottom and the tapered top having a length ratio in the range of 1.5 to 7 such as 2 to 5, e.g. 2.5 to 4.

The directing guide can have an inflow deflector, such as a plane-like in-flow deflector, for deflecting a flow of beverage delivered by the unit outlet thereon when the directing guide is in its dispensing position. The inflow deflector can have at least one of the following features: the inflow deflector is a member extending longitudinally at an angle to a horizontal direction; the inflow deflector is located at a foot of the inflow penetrator; and the inflow deflector is spaced above the bottom of the directing guide to allow a flow of waste liquid under the deflector.

The directing guide may have an inflow confinement panel for confining a flow of beverage upon exposure to the inflow penetrator. The confinement panel may extend: over more than half of a height (e.g. an average height) of the flow cavity at the confinement panel, the confinement panel being for instance generally upright; and/or generally in parallel to a or the inflow deflector onto which a flow of beverage is deflected upon exposure to the inflow penetrator; and/or spaced above the bottom of the flow cavity so as to allow a passage of beverage under the confinement panel.

The confinement panel, if and when present, may be used for the formation of a pool or beverage to retain large bubbles in the beverage behind the confinement panel so that only the beverage's liquid and fine bubbles (when present) are let beyond the confinement panel.

The directing guide can include a beverage dam arrangement that is formed of at least one beverage retaining wall, such as one or more upright retaining walls, for accumulating a pool of beverage in the cavity upstream the dam arrangement.

Such a dam (when present) may allow the formation of a pool of beverage upstream of the dam. Hence, when the (liquid) beverage is formed together with foam, such a pool may improve the foam management of beverage dispensed outside the machine.

The dam arrangement may include one or more of:
two or more retaining walls arranged successively in the cavity along a direction of flow of beverage;
at least one retaining wall that has a bottom edge under which beverage may pass and/or a top edge over which beverage may pass;
at least one retaining wall that has one or more sidewalls around which beverage may pass;
at least one retaining wall that extends from the bottom of the cavity;
at least one retaining wall that extends from at least one sidewall of the cavity, such as a pair of retaining walls that extend towards each other from facing sidewalls, e.g. a pair retaining walls that extend along a same direction or along mutually intercepting directions;
at least one retaining wall that is spaced from all sidewalls of the cavity;
at least one retaining wall that extends generally transversally to a direction of flow of beverage in the cavity, optionally the retaining wall extending along a direction that is perpendicular to the direction of flow or at an angle thereto in the range of 1 to 45 deg., such as 5 to 30 deg., e.g. 10 to 20 deg.;
at least one retaining wall having at least one section that extends along a straight direction, such as along one, two or three different straight directions, optionally the retaining wall being made of one or more planar portions; and
at least one retaining wall having at least one section that extends along a curved direction, optionally the retaining wall being made of one or more of cylindrical, conical, spherical and ellipsoidal portions.

The directing guide can be movable from: a dispensing position in which the directing guide is positioned to direct beverage to the placing area; to a non-dispensing position for directing by the directing guide waste liquid, such as residual beverage and/or cleaning fluid, to a waste collector; and vice versa.

The waste collector may include a removable receptacle, e.g. located with a machine's frame such as a machine housing. Examples of such collectors are disclosed in EP 1 867 260, WO 2009/074557, WO 2009/074559, WO 2009/135869, WO 2011/086087 and WO 2011/154492. Typically, the waste collector is configured for collecting at least one of: one or more waste beverage ingredients, such as a used flavouring ingredient and/or waste water; one or more used capsules for supplying a beverage ingredient into the machine; and a cleaning agent, such as a cleaning, rinsing or descaling liquid.

The machine may include an evacuation guide and an actuator, e.g. comprising a return spring and/or a motor, such as an electric or a hydraulic motor. Such motor may be a rotary motor or a linear motor or an electro-mechanical solenoid, e.g. cooperating with a return spring.

The directing guide can be configured to deliver the beverage or the waste liquid into the evacuation guide towards the placing area or towards the waste collector. The directing guide can be movable relative to the evacuation guide, the evacuation guide being actuated by the actuator to act on the directing guide so as to move the directing guide towards at least one of the dispensing position and the non-dispensing position.

It follows that the evacuation guide that can be used for evacuating beverage and/or waste liquid from the directing guide can also be used to act on the directing guide to move it between its dispensing and non-dispensing position.

For instance, the directing guide is in the non-dispensing configuration when the machine is not processing any beverage and then moved into the dispensing configuration when the machine starts to process or dispense a beverage. A beverage may be processed during a period of time within the machine before any dispensing of beverage is intended (e.g. a pre-wetting period of a beverage ingredient intend to be brewed), in which case the directing guide may be moved into the dispensing configuration either at the beginning of the beverage processing or at the beginning of the beverage dispensing or at some point in time between these two events.

The directing guide can be associated with a biasing device, such as a spring, e.g. a spring blade or spring wire or spiral or helicoidal spring, for urging the directing guide into its dispensing position or into its non-dispensing position. The directing guide can be urged selectively into its dispensing position and into its non-dispensing position by such a biasing device, e.g. comprising a bistable resilient arrangement.

The evacuation guide may be arranged to push and/or pull the directing guide, the evacuation guide being for instance urged against the directing guide.

The machine can have a stationary frame (e.g. a frame that is stationary during the normal use of the machine to dispense beverage). The directing guide may be pivotally and/or translationally, directly or indirectly, mounted to the frame, e.g. about a pivoting axis, the evacuation guide being pivotally and/or translationally, directly or indirectly, mounted to the frame. For example, the directing guide is pivotally driven by a translational actuation by the evacuation guide.

The machine can include a transmission, e.g. a toothed and/or friction transmission, for transmitting a movement from the actuator to the evacuation guide, such as a transmission having one or more transmission elements selected from connecting rods, knuckle joints, gears, pinions, wheels, belts and racks.

The machine may include a control unit for controlling at least one of the motor (when present) and electric machine components, such as a liquid driver, thermal conditioner, a user-interface. Examples of control units and user-interfaces are disclosed in WO 2008/138710, WO 2009/043851, WO 2009/043865, WO 2009/092745, WO 2010/003932, WO 2010/037806, WO 2010/046442, WO 2011/020779, WO 2011/026853, WO 2011/054889, WO 2011/067156, WO 2011/067157, WO 2011/067181, WO 2011/067188, WO 2011/067191, WO 2011/067227, WO 2011/067232, WO 2011/144719, WO 2012/032019, WO 2012/072761, WO 2012/072764, WO 2012/072767 and WO 2012/093107.

The evacuation guide may have a conduit as well as a tub or funnel in fluid communication with the conduit, the tub or funnel being configured to collect beverage or waste liquid from the directing guide and to guide it into the conduit towards the placing area or towards the waste collector. The evacuation guide may include one or more of the following features:
the tub or funnel is configured to contact the directing guide to move it between the dispensing and non-dispensing positions;
the tub or funnel extends generally along a direction below the directing guide, the tub or funnel direction being optionally generally horizontal or at a small angle thereto, e.g. at an angle in the range of 1 to 30 deg. such as 2 to 15 deg.;
the conduit is in contact and driven by the actuator, directly or indirectly, via a or the transmission;
the conduit extends along a generally upright conduit direction and is arranged to move linearly generally along the upright direction, optionally the upright direction being vertical or at a small angle thereto, e.g. at an angle in the range of 1 to 30 deg. such as 2 to 15 deg.; and
the conduit extends generally downwards from a side and/or bottom of the tub or funnel.

The machine can have: a user-removable support frame that supports the directing guide; and a seat above the placing area for removably receiving the support frame.

It follows that by assembling the movable directing guide on a removable support frame, the movable directing guide can be easily removed by the user from the machine for replacement after extended use or for servicing, e.g. cleaning especially to avoid clogging or malfunctioning of the directing guide due to residual beverage. Whereas the motion of the movable directing guide in the stationary frame of the machine is configured for the directing of liquid in the machine, the movability of the support frame (with the directing guide) is configured for a motion of the support frame into and out of the machine's stationary frame. The movable directing guide can be separated from its support frame conveniently outside the machine upon removal of the support frame with the directing guide from the stationary frame.

As the removable support frame and the directing guide can be removed from and inserted into the seat by an ordinary user, no special (safety) tool, at least no tool going beyond tools that can be ordinarily found in households, or special skills or knowledge is required therefor. In any case, no special training or (service) personnel is required to operate the support frame and the directing guide.

Optionally, such machine has one or more of the following features:

the support frame has an assembly arrangement for movably assembling the directing guide to the support frame whereby the directing guide is movable in the support frame from a or the dispensing position to a or the non-dispensing position and vice versa, for instance the assembly arrangement having a bearing for pivotably mounting an axle of the directing guide or having an axle for pivotably mounting a bearing of the directing guide to allow the directing guide to move on the support frame from its dispensing position to its non-dispensing position and vice versa;

the directing guide is urged into a or the dispensing position or into a or the non-dispensing position by a biasing device, such as a spring e.g. a spring blade or spring wire or spiral or helicoidal spring, that is mounted to the support frame and to the directing guide, for instance the directing guide being urged selectively into its dispensing position and into its non-dispensing position by such a biasing device that comprises a bistable resilient arrangement; and the user-removable support frame and the directing guide are secured in the seat by a securing arrangement, such as a snap arrangement and/or a magnetic arrangement and/or a lock.

The support frame can have:

an upstream opening adjacent the unit outlet when the directing guide and the support frame are in the seat such that beverage and/or waste liquid may pass from the unit outlet into the directing guide via the upstream opening, such as an upstream opening formed in a top panel of the support frame and/or delimited by an upper end of a sidewall of support frame; and one or more downstream openings for allowing a passage of beverage from the directing guide to the placing area and/or of liquid waste from the directing guide to the waste collector when the support frame and the directing guide are received in the seat, such as (a) downstream opening(s) formed in a bottom panel of the support frame and/or delimited by (a) lower end(s) of (a) sidewall(s) of the support frame.

The machine can have a locking arrangement that is movable between: a locking position in which the locking arrangement locks the support frame and the directing guide in the seat; and an unlocking position in which the locking arrangement allows at least a removal of the support frame and the directing guide from the seat and optionally an insertion of the support frame and the directing guide into the seat. For instance, the locking arrangement forms a movable part of the beverage processing unit, such as a movable part of a mixing or brewing module of the processing unit, which part can be moved into an open position for inserting and/or removing an ingredient into the module, e.g. into a module's chamber such as an ingredient capsule chamber, and into a closed position for processing the ingredient.

The directing guide can have a beverage outlet that is configured for beverage to drain out of the flow cavity to the placing area and optionally a waste outlet that is configured for waste liquid to drain out of the flow cavity to a or the waste collector. The beverage outlet or, when present, the waste outlet can be associated with an arrangement for directing beverage or liquid waste in a desired direction out of the outlet. Such arrangement may include one or more ribs or rods projecting into the outlet or extending along the outlet. Optionally, the directing guide is moved into a or the dispensing position so that the flow cavity is tilted towards the beverage outlet, and is moved into a or the non-dispensing position so that the flow cavity is tilted towards the waste outlet. The flow cavity can have a or the inflow deflector that is located between the beverage outlet and the waste outlet, such as an inflow deflector that is spaced above the bottom of the cavity so that beverage and/or waste liquid can drain along the bottom under the inflow deflector.

When reference is made in the present description to an orientation or position relative to the machine or parts thereof, e.g. "above" or "below" or "vertical" or "horizontal", the orientation or position takes as a reference the position and orientation of the machine in operation to process the liquid food substance in the food cavity unless specified otherwise.

BRIEF DESCRIPTION OF THE DRAWINGS

The invention will now be described with reference to the schematic drawings, wherein:

FIGS. 4 to 8 illustrate the directing guide with an inflow penetrator and a flow cavity and different flow managing elements in the cavity;

FIG. 9 is a perspective view of the beverage machine according to the invention which has a locking arrangement in position for locking the directing guide and a support frame in the corresponding machine's seat;

FIG. 10 shows the machine of FIG. 9 with its locking arrangement in the unlocked position;

FIGS. 11 to 13 form a sequence illustrating the removal of the directing guide and in its support frame from the machine's seat;

FIG. 14 is a perspective view from below of the directing guide in the support frame;

FIG. 15 is a perspective view from above of the directing guide in the support frame; and FIG. 16 is an exploded view of the directing guide, the support frame and a biasing element for biasing the guide into the dispensing or non-dispensing position.

DETAILED DESCRIPTION

The following description in connection with the appended figures illustrates a non-limiting example and possible variations thereof of a machine according to the invention.

Figure 1:
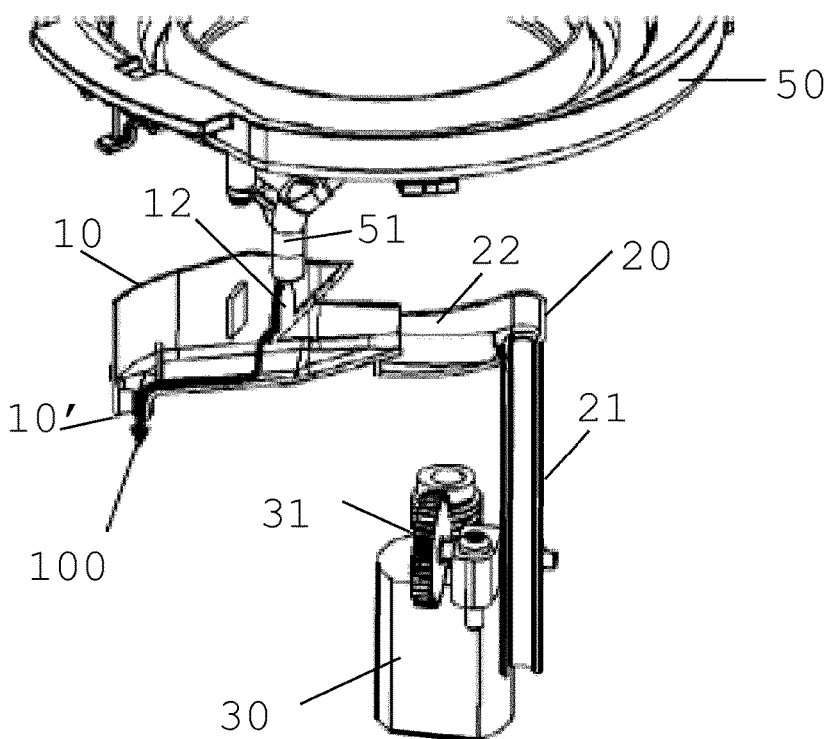
FIG. 1 illustrates part of a machine with a directing guide having an inflow penetrator according to the invention, the directing guide having also a dispensing position, the machine having an evacuation guide as well.
Figure 3:
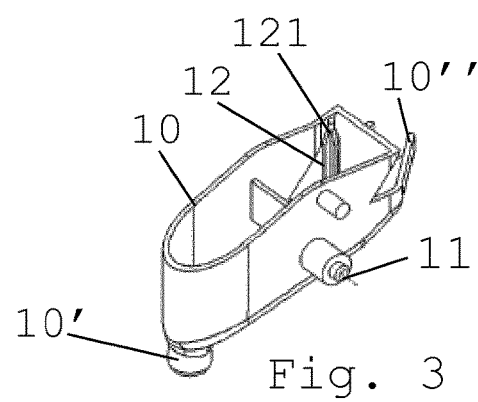
FIG. 3 is a perspective view of the directing guide with the inflow penetrator of FIGS. 1 and 2.
Figure 2:
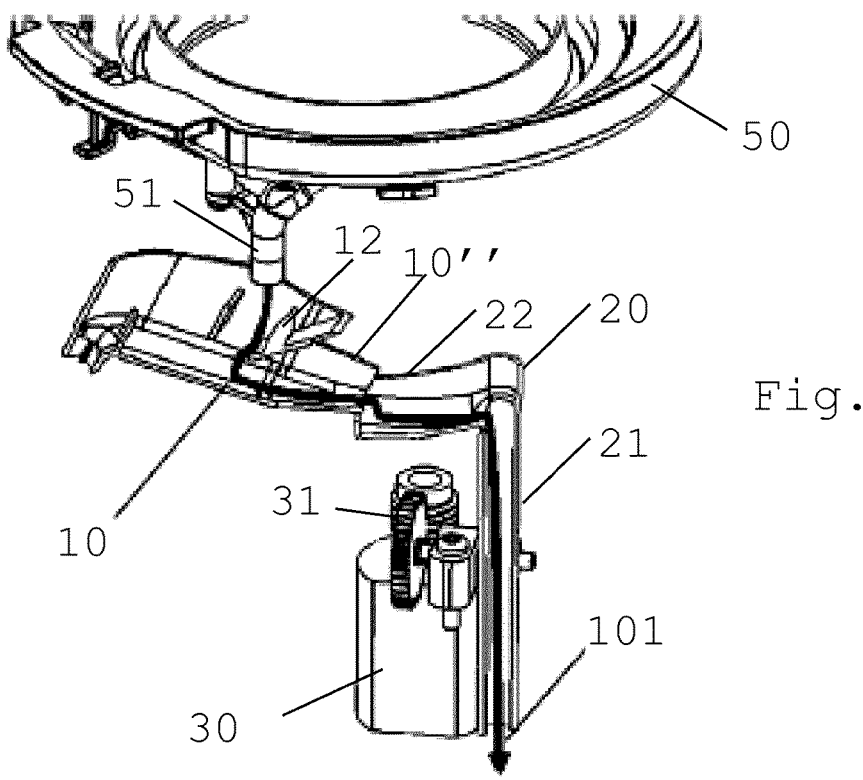
FIG. 2 illustrates the same parts as in FIG. 1 with the directing guide in a non-dispensing position.

FIGS. 1 to 16 illustrate an exemplary machine 1 for dispensing a beverage 100 (FIGS. 9 and 10) according to the invention, as well as parts (FIGS. 1 to 3 and 11 to 16), and variations (FIGS. 4 to 8) thereof.

Machine 1 has: a beverage directing guide 10 for directing by directing guide 10 a beverage 100 to an area 2 for placing a user-recipient, e.g. a cup or a mug, to collect such dispensed beverage 100; and a beverage processing unit 5 having a beverage guide 50 and a unit outlet 51 via which liquid 100,101, e.g. beverage 100 and/or waste liquid 101, is passed from beverage guide 50 to directing guide 10 that is located below unit outlet 51. Directing guide 10 has a flow cavity 10a, a bottom 10b and sidewalls 10c such that bottom 10b and sidewalls 10c delimit flow cavity 10a.

Directing guide 10 has an inflow penetrator 12, such as an inflow-exposed protuberance 12, for penetrating a flow of beverage 100 delivered by unit outlet 51 onto inflow penetrator 12 prior to reaching bottom 10b of flow cavity 10a.

Inflow penetrator 12 may have one or more of the following features:

an upright generally spear-shaped member, such as a member having a cross-section that has the shape of a cross or star or circle or convex polygon;

a top 121, such as a tapered top, that extends into the unit outlet 51, e.g. over a length in the range of 0.01 to 7 mm such as 0.3 to 3 mm, or that is spaced under the unit outlet 51 by a distance in the range of 0.01 to 5 mm such as 0.3 to 3 mm; and a tapered top 121, e.g. a tapered top extending over a length in the range of 1 to 7 mm such as 2 to 5 mm, that extends from a cylindrical or prismatic penetrator bottom 122, e.g. a bottom extending over a length in the range of 1 to 15 mm such as 3 to 7 mm, optionally penetrator bottom 122 and tapered top 121 having a length ratio in the range of 1.5 to 7 such as 2 to 5, e.g. 2.5 to 4.

Directing guide 10 can have an inflow deflector 13, such as a plane-like in-flow deflector, for deflecting a flow of beverage 100 upon exposure to penetrator 12.

Inflow deflector 13 may have at least one of the following features: inflow deflector 13 is a member extending longitudinally at an angle to a horizontal direction; inflow deflector 13 is located at a foot of the inflow penetrator; and inflow deflector 13 is spaced above bottom 10b of directing guide 10 to allow a flow of waste liquid 101 under deflector 12.

Directing guide 10 can have an inflow confinement panel 14, 14a for confining a flow of beverage 100 upon exposure to penetrator 12. Confinement panel 14, 14a may extend: over more than half of a height (e.g. an average height) of flow cavity 10a at confinement panel 14, confinement panel 14 being for instance generally upright; and/or generally in parallel to a or the inflow deflector 13 onto which a flow of beverage 100 is deflected upon exposure to penetrator 12; and/or spaced above bottom 10b of flow cavity 10a so as to allow a passage of beverage 100 under confinement panel 14, 14a.

Directing guide 10 may include a beverage dam arrangement that is formed of at least one beverage retaining wall 15, 15a, 15b, 15c, 15d, such as one or more upright retaining walls, for accumulating a pool of beverage 100 in cavity 10a upstream dam arrangement. Dam arrangement may have one or more of:

two or more retaining walls 15a, 15c arranged successively in cavity 10a along a direction of flow of beverage 100;

at least one retaining wall 15a that has a bottom edge under which beverage 100 may pass and/or a top edge over which beverage 100 may pass;

at least one retaining wall 15b, 15c, 15d that has one or more sidewalls around which beverage 100 may pass;

at least one retaining wall 15, 15c that extends from bottom 10b of cavity 10a;

at least one retaining wall 15a, 15b, 15d that extends from at least one sidewall 10c of cavity 10a, such as a pair of retaining walls 15b, 15d that extend towards each other from facing sidewalls 10c, e.g. a pair retaining walls 15b, 15d that extend along a same direction or along mutually intercepting directions;

at least one retaining wall 15c that is spaced from all sidewalls 10c of cavity 10a;

at least one retaining wall 15b, 15d that extends generally transversally to a direction of flow of beverage 100 in the cavity, optionally retaining wall 15b, 15d extending along a direction that is perpendicular to the direction of flow or at an angle thereto in the range of 1 to 45 deg., such as 5 to 30 deg., e.g. 10 to 20 deg.;

at least one retaining wall 15a, 15b, 15d having at least one section that extends along a straight direction, such as along one, two or three different straight directions, optionally the retaining wall being made of one or more planar portions; and at least one retaining wall 15c having at least one section that extends along a curved direction, optionally the retaining wall being made of one or more of cylindrical, conical, spherical and ellipsoidal portions.

Directing guide 10 can be movable from: a dispensing position in which directing guide 10 is positioned to direct beverage 100 to area 2 for placing a user-recipient; to a non-dispensing position for directing by the directing guide 10 waste liquid 101, such as residual beverage and/or cleaning fluid, to a waste collector 3; and vice versa.

Machine 1 may further include an evacuation guide 20 and an actuator 30 e.g. comprising a return spring and/or a motor such as an electric or a hydraulic motor. Directing guide 10 can be configured to deliver beverage 100 or waste liquid 101 into evacuation guide 20 towards placing area 2 or towards waste collector 3. Directing guide 10 may be movable relative to evacuation guide 20. Evacuation guide 20 may be actuated by actuator 30 to act on directing guide 10 so as to move directing guide 10 towards at least one of the dispensing position and the non-dispensing position. Directing guide 10 can be associated with a biasing device 17, such as a spring, e.g. a spring blade or spring wire or spiral or helicoidal spring, for urging directing guide 10 into its dispensing position or into its non-dispensing position.

For instance, directing guide 10 is urged selectively into its dispensing position and into its non-dispensing position by such a biasing device that may include a bistable resilient arrangement.

Evacuation guide 20 can be arranged to push and/or pull directing guide 10, evacuation guide 20 being for instance urged against the directing guide 10.

Machine 1 can have a stationary frame 4, directing guide 10 being pivotally and/or translationally, directly or indirectly, mounted to frame 4, e.g. about a pivoting axis 11, the evacuation guide 20 being pivotally and/or translationally, directly or indirectly, mounted to frame 4. Directing guide 10 can be pivotally driven by a translational actuation by evacuation guide 20.

Machine 1 may include a transmission 31, e.g. a toothed and/or friction transmission, for transmitting a movement from actuator 30 to evacuation guide 20, such as a transmission comprising one or more transmission elements selected from connecting rods, knuckle joints, gears, pinions, wheels, belts and racks.

Evacuation guide 20 can have a conduit 21 and a tub or funnel 22 in fluid communication with conduit 21. Tub or funnel 22 may be configured to collect beverage 100 or waste liquid 101 from directing guide 10 and to guide it into conduit 21 towards the placing area or towards waste collector 3. For example, evacuation guide 20 has one or more of the following features:

tub or funnel 22 is configured to contact directing guide 10 to move it between the dispensing and non-dispensing positions;

tub or funnel 22 extends generally along a direction below directing guide 10, the tub or funnel direction being optionally generally horizontal or at a small angle thereto, e.g. at an angle in the range of 1 to 30 deg. such as 2 to 15 deg.;

conduit 21 is in contact and driven by actuator 30 directly or indirectly via a or the transmission 31;

conduit 21 extends along a generally upright conduit direction and is arranged to move linearly generally along the upright direction, optionally the upright direction being vertical or at a small angle thereto, e.g. at an angle in the range of 1 to 30 deg. such as 2 to 15 deg.; and conduit 21 extends generally downwards from a side and/or bottom of tub or funnel 22.

Machine 1 can have: a user-removable support frame 16 that supports directing guide 10; and a seat 52 above placing area 2 for removably receiving support frame 16. Machine 1 may have one or more of the following features:

support frame 16 has an assembly arrangement 161 for movably assembling the directing guide 10 to support frame 16 whereby directing guide 10 is movable in support frame 16 from a or the dispensing position to a or the non-dispensing position and vice versa, the assembly arrangement may have a bearing 161 for pivotably mounting an axle 11 of the directing guide 10 or may have an axle for pivotably mounting a bearing of directing guide 10 to allow directing guide 10 to move on the support frame from its dispensing position to its non-dispensing position and vice versa;

directing guide 10 is urged into a or the dispensing position or into a or the non-dispensing position by a biasing device 17, such as a spring e.g. a spring blade or spring wire or spiral or helicoidal spring, that is mounted to support frame 16 and to directing guide 10, directing guide 10 may be urged selectively into its dispensing position and into its non-dispensing position by such a biasing device that comprises for instance a bistable resilient arrangement; and user-removable support frame 16 and directing guide 10 can be secured in seat 52 by a securing arrangement, such as a snap arrangement and/or a magnetic arrangement and/or a lock.

Support frame 16 can have:

an upstream opening 18 adjacent unit outlet 51 when directing guide 10 and support frame 16 are in seat 52 such that beverage 100 and/or waste liquid 101 may pass from unit outlet 51 into directing guide 10 via upstream opening 18, such as an upstream opening 18 formed in a top panel 162 of support frame 16 and/or delimited by an upper end of a sidewall of support frame 16; and one or more downstream openings 19 allowing a passage of beverage 100 from directing guide 10 to placing area 2 and/or of liquid waste 101 from directing guide to waste collector 3 when support frame 16 and directing guide 10 are received in seat 52, such as (a) downstream opening(s) 19 formed in a bottom panel of support frame 16 and/or delimited by (a) lower end(s) 163 of (a) sidewall(s) of support frame 16.

Machine 1 can have a locking arrangement 53 that is movable between: a locking position in which locking arrangement 53 locks support frame 16 and directing guide 10 in seat 52; and an unlocking position in which locking arrangement 53 allows at least a removal of support frame 16 and directing guide 10 from the seat and optionally an insertion of support frame 16 and directing guide 10 into seat 15. Locking arrangement 53 may form a movable part of beverage processing unit 5 such as a movable part 53 of a mixing or brewing module of processing unit 5 which part can be moved: into an open position for inserting and/or removing an ingredient into the module, for instance into a module's chamber 54 e.g. an ingredient capsule chamber 54; and into a closed position for processing the ingredient.

Directing guide 10 may have a beverage outlet 10' that is configured for beverage 100 to drain out of flow cavity 10a to placing area 2 and optionally a waste outlet 10" that is configured for waste liquid 101 to drain out of flow cavity 10a to a or waste collector 3. Beverage outlet 10', or when present waste outlet 10", can be associated with an arrangement 10''' for directing beverage 100 or liquid waste 101 in a desired direction out of outlet 10',10", such as an arrangement 10''' comprising one or more ribs or rods projecting into outlet 10',10" or extending along the outlet. Directing guide 10 can be moved into a or the dispensing position so that flow cavity 10a is tilted towards beverage outlet 10' and can be moved into a or the non-dispensing position so that flow cavity 10a is tilted towards waste outlet 10". For example, flow cavity 10a has a or the inflow deflector 13 that is located between beverage outlet 10' and waste outlet 10", such as inflow deflector 13 that is spaced above bottom 10b of the cavity 10a so that beverage 100 and/or waste liquid 101 can drain along bottom 10b under inflow deflector 13.

The invention claimed is:

1. A machine for dispensing a beverage, the machine comprising:

a beverage directing guide configured for directing the beverage to a placing area configured for placing a user-recipient; and a beverage processing unit having a beverage guide and a unit outlet, wherein the unit outlet is configured to pass a liquid that is at least one of the beverage or a waste liquid from the beverage guide to the beverage directing guide, wherein the beverage directing guide is located below the unit outlet, the beverage directing guide having a flow cavity, a bottom, and sidewalls such that the bottom and the sidewalls delimit the flow cavity, the beverage directing guide has an inflow penetrator configured for penetrating a flow of the beverage delivered by the unit outlet onto the inflow penetrator prior to reaching the bottom of the beverage directing guide, the beverage directing guide has an inflow deflector configured for deflecting the flow of the beverage upon exposure to the inflow penetrator, wherein the inflow deflector is located at a foot of the inflow penetrator.

2. The machine of claim 1, wherein the inflow penetrator has one or more features selected from the group consisting of:

an upright spear-shaped member;

a top that extends into the unit outlet or that is positioned under the unit outlet; and a tapered top.

3. The machine of claim 1, wherein the inflow deflector has at least one feature selected from the group consisting of:

the inflow deflector comprises a member extending longitudinally at an angle to a horizontal direction; and the inflow deflector is spaced above the bottom of the beverage directing guide to allow the waste liquid to flow under the inflow deflector.

4. The machine of claim 1, wherein the beverage directing guide has an inflow confinement panel configured for confining the flow of the beverage upon exposure to the inflow penetrator.

5. The machine of claim 1, wherein the beverage directing guide has a beverage outlet configured for the beverage to drain out of the flow cavity to the placing area.

6. The machine of claim 1, which has:
a user-removable support frame that supports the beverage directing guide; and
a seat above the placing area configured for removably receiving the user-removable support frame.

7. The machine of claim 6, wherein the user-removable support frame has:
an upstream opening adjacent the unit outlet when the beverage directing guide and the user-removable support frame are in the seat such that the beverage or the waste liquid may pass from the unit outlet into the beverage directing guide via the upstream opening; and
one or more downstream openings configured for allowing passage of the beverage from the beverage directing guide to the placing area and/or of the waste liquid from the directing guide to the waste collector when the support frame and the beverage directing guide are received in the seat.

8. The machine of claim 6, which has a locking arrangement that is movable between:
a locking position in which the locking arrangement locks the support frame and the beverage directing guide in the seat; and
an unlocking position in which the locking arrangement allows at least a removal of the support frame and the beverage directing guide from the seat.

9. The machine of claim 8, wherein, when the locking arrangement is in the unlocking position, the locking arrangement allows insertion of the support frame and the beverage directing guide into the seat.

10. A machine for dispensing a beverage, the machine comprising:
a beverage directing guide configured for directing the beverage to a placing area configured for placing a user-recipient; and
a beverage processing unit having a beverage guide and a unit outlet, wherein the unit outlet is configured to pass a liquid that is at least one of the beverage or a waste liquid from the beverage guide to the beverage directing guide located below the unit outlet,
the beverage directing guide having a flow cavity, a bottom, and sidewalls such that the bottom and the sidewalls delimit the flow cavity,
the beverage directing guide has an inflow penetrator configured for penetrating a flow of the beverage delivered by the unit outlet onto the inflow penetrator prior to reaching the bottom of the beverage directing guide,
wherein the beverage directing guide comprises a beverage dam arrangement that is formed of at least one beverage retaining wall, the at least one beverage retaining wall being configured for accumulating a pool of the beverage in the flow cavity upstream of the beverage dam arrangement.

11. The machine of claim 10, wherein the dam arrangement comprises one or more components selected from the group consisting of:
two or more retaining walls arranged successively in the flow cavity along a direction of flow of the beverage;
at least one retaining wall that has a bottom edge under which the beverage may pass and/or a top edge over which the beverage may pass;
at least one retaining wall that has one or more sidewalls around which the beverage may pass;
at least one retaining wall that extends from the bottom of the beverage directing guide;
at least one retaining wall that extends from at least one sidewall of the beverage directing guide;
at least one retaining wall that is spaced from all sidewalls of the beverage directing guide;
at least one retaining wall that extends transversally to a direction of flow of the beverage in the flow cavity;
at least one retaining wall having at least one section that extends along a straight direction, such as along one, two, or three different straight directions; and
at least one retaining wall having at least one section that extends along a curved direction.

12. The machine of claim 11, wherein the dam arrangement comprises a pair of retaining walls that extend towards each other from facing sidewalls of the beverage directing guide.

13. A machine for dispensing a beverage, the machine comprising:
a beverage directing guide configured for directing the beverage to a placing area for placing a user-recipient; and
a beverage processing unit having a beverage guide and a unit outlet, wherein the unit outlet is configured to pass a liquid that is at least one of the beverage or a waste liquid from the beverage guide to the beverage directing guide located below the unit outlet,
the beverage directing guide having a flow cavity, a bottom, and sidewalls such that the bottom and the sidewalls delimit the flow cavity,
the beverage directing guide has an inflow penetrator configured for penetrating a flow of the beverage delivered by the unit outlet onto the inflow penetrator prior to reaching the bottom of the beverage directing guide;
wherein the beverage directing guide is movable from: a dispensing position in which the beverage directing guide is positioned to direct the beverage to the placing area configured for placing a user-recipient; to a non-dispensing position in which the beverage directing guide is positioned to direct the waste liquid to a waste collector; and vice versa.

14. The machine of claim 13, further comprising an evacuation guide and an actuator, the beverage directing guide being configured to deliver the beverage or the waste liquid into the evacuation guide towards the placing area or towards the waste collector, the beverage directing guide being movable relative to the evacuation guide, the evacuation guide being actuated by the actuator to act on the beverage directing guide so as to move the beverage directing guide towards at least one of the dispensing position and the non-dispensing position.

15. The machine of claim 14, which has a stationary frame, the beverage directing guide being pivotally and/or translationally, directly or indirectly, mounted to the stationary frame, the evacuation guide being pivotally and/or translationally, directly or indirectly, mounted to the stationary frame.

16. The machine of claim 14, wherein the evacuation guide has a conduit and a tub or a funnel in fluid communication with the conduit, the tub or the funnel being configured to collect the beverage or the waste liquid from the beverage directing guide and to guide the beverage or the waste liquid into the conduit towards the placing area or towards the waste collector.

17. The machine of claim 14, wherein the evacuation guide is arranged to push and/or pull the beverage directing guide.

18. The machine of claim 17, wherein the actuator is configured to urge the evacuation guide against the beverage directing guide.

19. The machine of claim 14, which comprises a transmission configured for transmitting a movement from the actuator to the evacuation guide.

20. The machine of claim 19, wherein the transmission comprises one or more transmission elements selected from the group consisting of connecting rods, knuckle joints, gears, pinions, wheels, belts, and racks.

* * * * *